US006264777B1

(12) United States Patent
Yamaguchi

(10) Patent No.: US 6,264,777 B1
(45) Date of Patent: Jul. 24, 2001

(54) LAMINATED COMPOSITE ELECTRONIC DEVICE AND A MANUFACTURING METHOD THEREOF

(75) Inventor: Takashi Yamaguchi, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/551,956

(22) Filed: Apr. 19, 2000

Related U.S. Application Data

(62) Division of application No. 09/017,958, filed on Feb. 3, 1998, now Pat. No. 6,080,468.

(30) Foreign Application Priority Data

Feb. 28, 1997 (JP) .................................................... 9-62481

(51) Int. Cl.[7] .............................. B32B 31/26; B32B 7/00

(52) U.S. Cl. .................................... 156/89.12; 156/89.16; 428/212; 428/699

(58) Field of Search ............................. 156/89.11, 89.12, 156/89.16; 428/212, 699

(56) References Cited

U.S. PATENT DOCUMENTS 4,624,896 * 11/1986 Watanabe et al. .
5,693,429 * 12/1997 Sengupta et al. .
5,827,605 * 10/1998 Nishide et al. .
6,080,468 * 6/2000 Yamaguchi .......................... 428/212

FOREIGN PATENT DOCUMENTS 0 357 088 * 3/1990 (EP) .
0 443 512 * 8/1991 (EP) .
6-148128 * 5/1994 (JP) .

* cited by examiner

*Primary Examiner*—Curtis Mayes
(74) *Attorney, Agent, or Firm*—Flynn, Thiel, Boutell & Tanis, P.C.

(57) ABSTRACT

A laminated composite electronic device has a laminated body formed by stacking ceramic layers which differ from each other in thermal expansion rate. Between those different ceramic layers are inserted intermediate ceramic layers a, b, c and d, each having thermal expansion rates differing from one another so as to reduce the difference between the neighboring ceramic layers in the thermal expansion rate thereof. Thereby, it is possible to manufacture the laminated composite electronic device by baking without deformation nor cracks forming therein.

9 Claims, 2 Drawing Sheets

LAMINATED COMPOSITE ELECTRONIC DEVICE AND A MANUFACTURING METHOD THEREOF

This is a division of Ser. No. 09/017,958, filed Feb. 3, 1998, now U.S. Pat. No. 6,080,468

BACKGROUND OF THE INVENTION

1. Field of the Invention

The present invention relates to a laminated composite electronic device constructed with different kinds of ceramic layers, such as magnetic ceramic and dielectric ceramic layers, and in particular, to a laminated composite electronic device combining an inductance portion, in which internal electrodes are formed in a spiral shape in the laminated magnetic ceramic layers, with a capacitor portion, in which a pair of internal electrodes opposing each other are formed within the laminated dielectric ceramic layers.

2. Description of Prior Art

In manufacturing electronic devices of a laminated composite type, there are available two kinds of methods for obtaining a laminated body, one of which is so-called slurry build method and the other of which is so-called sheet method. In the slurry build method, magnetic paste and electric conductive paste are printed over one another by a method such as screen printing so as to form the magnetic material layers and an internal electrode pattern having a spiral shape therein, and a dielectric paste and the electrically conductive paste are also printed over one another to form the dielectric material layers and a pair of internal electrode patterns opposing each other therein. In the sheet method of the latter, the magnetic ceramic green sheets on which the internal electrode patterns are printed in the spiral shape with the electric conductive paste in advance by the screen printing method are stacked, and the dielectric sheets on which the opposing internal electrodes are printed with the electrically conductive paste in advance are also stacked. The internal electrode patterns formed on the magnetic ceramic green sheets are connected one by one in the spiral shape via electrical conduction by means of so-called through-holes which are also provided on the magnetic ceramic green sheets in advance.

The laminated body which is obtained by either one of the methods mentioned above is ultimately baked, and the electrically conductive paste is also baked after being printed on both side surfaces on which the electrically conductive bodies are exposed to form external electrodes thereon. In this manner, the laminated composite electronic device can be obtained. Inside of the laminated body obtained in this manner, the magnetic material layers and the dielectric material layers are stacked or laminated as a unit. Further, in the magnetic material layers is formed the coil-shaped internal electrode stacked spirally in a direction of lamination thereof, and a part of the internal electrode is connected to the external electrode at an edge portion of the laminated body mentioned above. Further, in the dielectric material layers, at least one pair of internal electrodes are formed opposed to each other through the same layer(s), and those internal electrodes are extended or led out to the opposing edge surfaces of the laminated body to be electrically connected to the external electrodes, respectively. In this manner, the inductor and the capacitor are connected in a predetermined condition through the external electrodes.

Such a laminated composite electronic device, in the manufacturing process thereof, is made by baking the laminated body of the different kinds of ceramic layers at a high temperature, in the condition of joining them together and is cooled down thereafter.

However, there are cases that the different kinds of ceramics have respective thermal expansion rates which are greatly different from each other, in particular, such as between the magnetic ceramic layers and the dielectric ceramic layers. Then, because of the differences in the thermal expansion or shrinkage between the respective ceramic layers of the laminated body formed by baking, thermal stresses occur inside of the laminated body during a cooling process after the baking, thereby distorting the laminated body in shape and causing cracks inside of it.

Conventionally, there is proposed a means for preventing the thermal stress in the cooling process after the baking, such that a ceramic layer(s) combining the compositions of the magnetic ceramic layers and the dielectric ceramic layers is inserted between them.

However, even by combining the different kinds of ceramics, it is not necessarily possible to obtain a ceramic having an expected thermal expansion rate, therefore, it is not enough to prevent the laminated body fully from distorting in the shape thereof during the cooling process after the baking.

SUMMARY OF THE INVENTION

An object in accordance with the present invention is, for eliminating the problems in the conventional manufacturing process for laminated composite electronic devices, to provide a laminated composite electronic device and a manufacturing process thereof, in which the laminated body of the laminated composite electronic device can be baked without causing deformation and cracks therein.

For achieving the object mentioned above, in accordance with the present invention, there is provided a laminated composite electronic device in which laminated intermediate ceramic layers a, b, c and d, having different thermal expansion rates, gradually and stepwise from one another, are inserted between the neighboring ceramic layers of a laminated body 11 so as to reduce the difference in the thermal expansion rate between them. For the same purpose, in accordance with the present invention, there is also provided a manufacturing method of the laminated composite electronic device, in which ceramic green sheets are stacked in such a manner that the laminated intermediate ceramic layers a, b, c and d, having different thermal expansion rates gradually and stepwise from one another, are inserted between the ceramic green sheets forming the ceramic layers 1, 1' and 7, 7', which are different from each other and have different thermal expansion rates.

In this laminated composite electronic device, it is possible to prevent in the laminated body 11 the thermal stress caused by the difference in the thermal expansion rates between the ceramic layers 1,1' and 7,7' of the different kinds during the cooling process after the baking thereof. Thereby, it is possible to protect the laminated composite electronic device from deformation, such as curving, and cracks in the laminated body 11.

Namely, the laminated composite electronic device, in accordance with the present invention, can be characterized by the intermediate ceramic layers a, b, c and d, having different thermal expansion rates stepwise from one another, are positioned between the ceramic layers 1,1' and 7,7' of different kinds, so as to reduce the difference in the thermal expansion rates between the neighboring ceramic layers of the laminated body 11 in the laminated composite electronic device which has the different kinds of laminated ceramic layers 1,1' and 7,7' differing in thermal expansion rates.

As an example of those different kind ceramic layers 1,1' and 7,7' differing in their thermal expansion rates, the dielectric ceramic layers and the magnetic ceramic layers can be mentioned. In those ceramic layers, a glass component is added thereto, as the most effective example of the components for adjusting the thermal expansion rate thereof, which has a thermal expansion rate which differs from both the magnetic ceramic and the dielectric ceramic. Namely, by adjusting the thermal expansion rate with the components which are obtained by adding the glass component to that of either one of the different kinds of ceramic layers 1,1' or 7,7' mentioned above, the plurality of intermediate ceramic layers a, b, c and d, which differ in thermal expansion rate gradually and stepwise from one another can be obtained.

By inserting the intermediate ceramic layers a, b, c and d between the different kinds of ceramic layers 1,1' and 7,7' differing in thermal expansion rates, the difference in the thermal expansion rate between the neighboring ceramic layers in the laminated body 11 becomes small. Thereby, the thermal stress in the laminated body 11 can be released, as well as deformation such as a curvature and cracks inside thereof can be prevented from occurring in the cooling process after the baking. In particular, since the intermediate ceramic layers a, b, c and d differ in thermal expansion rates gradually and stepwise from one another, the thermal expansion rates of those respective ceramic layers forming the laminated body 11 also change gradually, thereby it is possible to reduce that difference between the neighboring ceramic layers. Further, if the difference in thermal expansion rates among neighboring ceramic layers is also large, it is necessary to appropriately change the thickness of the layer(s) of the intermediate ceramic layers a, b, c and d at that portion, such as by making it thicker.

The intermediate ceramic layers a, b, c and d mentioned above contain the same component which is the principal one of the ceramic layers of either one of the different kind ceramic layers 1,1' or 7,7', and the thermal expansion rate can be adjusted by changing the compositional content of the components thereof. As such, the ceramic layers a, b, c and d, magnetic ceramics of ferrite group, such as $Fe_2O_3$, NiO, ZnO and CuO can be mentioned. For instance, by changing the compositional content of NiO or ZnO contained in the magnetic ceramic, the thermal expansion rate thereof is appropriately adjusted.

A manufacturing method of such a laminated composite electronic device has steps of stacking different kinds of ceramic green sheets to form a laminated body; and baking said laminated body, wherein the intermediate ceramic layers of the ceramic green sheet, differing in the thermal expansion rate gradually and stepwise from one another, are formed, so as to reduce the difference in thermal expansion rates between the neighboring ceramic layers of the laminated body 11, and the formed intermediate ceramic layers of the ceramic green sheets are inserted between the ceramic green sheets, forming the different kinds of ceramic layers 1,1' and 7,7' which differ from each other in thermal expansion rates, when the ceramic green sheets are stacked.

DETAILED DESCRIPTION OF PREFERRED EMBODIMENTS

Hereinafter, embodiments according to the present invention will be fully explained by referring to the attached drawings.

Figure 1:
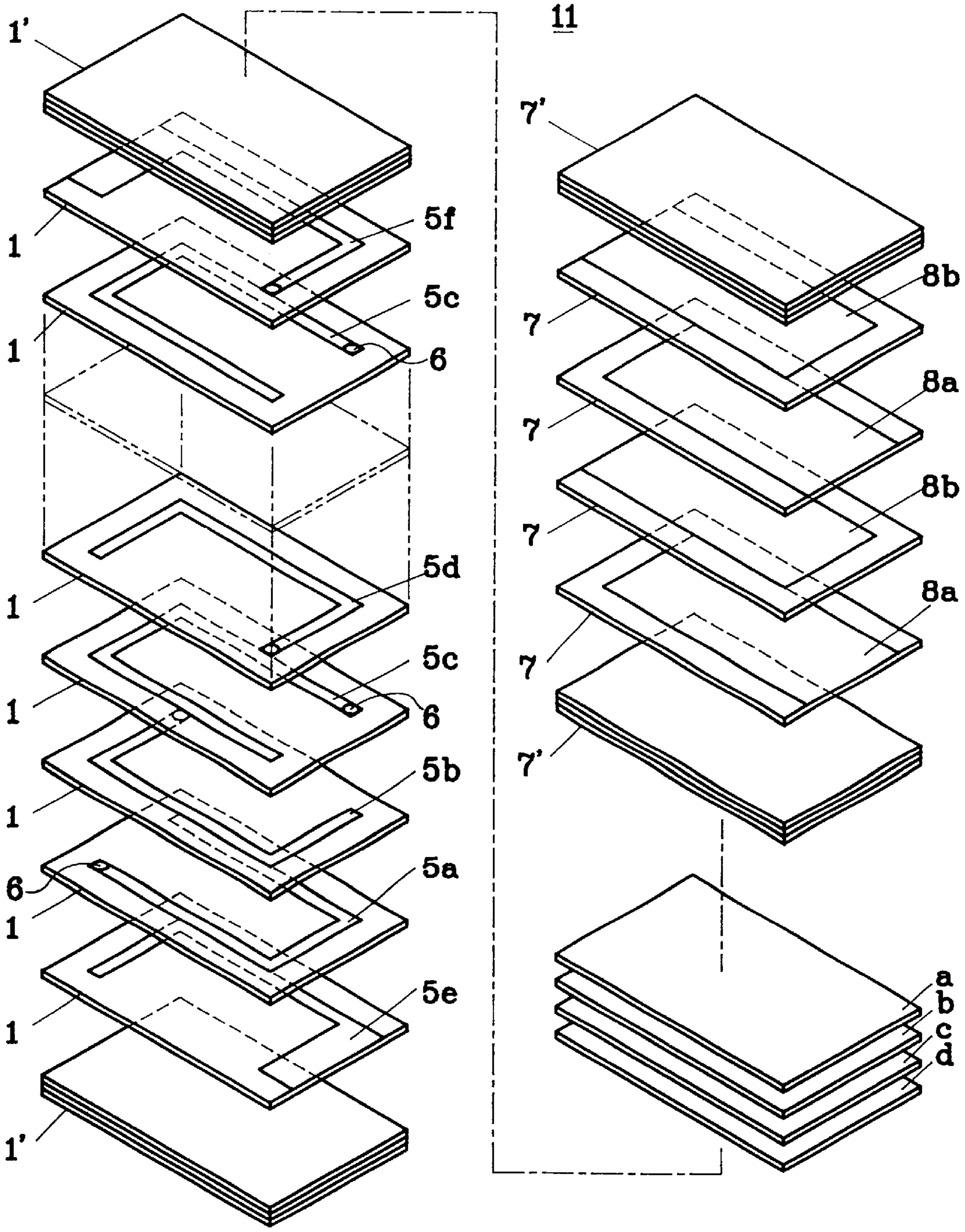
FIG. 1 shows an exploded perspective view of a laminated body of a laminated composite electronic device in accordance with the present invention.

FIG. 1 shows construction of a laminated body of a laminated composite electronic device, in particular of a LC element. The laminated body mentioned above is manufactured at the same time in large numbers in the following manner.

First, thin magnetic ceramic green sheets formed of a magnetic slurry which is obtained by dispersing powder of a magnetic material, such as ferrite powder into a binder, by using the so-called a doctor blade method or an extruder. At predetermined positions on the ceramic green sheets are punched or penetrated the through-holes in advance. After that, internal electrode patterns are printed on the ceramic green sheets with an electrically conductive paste such as silver paste, aligning them in vertical and/or horizontal directions in a circular fashion, for a large number of sets thereof, and the conductive paste is vacuumed through and printed on inner surfaces of the through-holes as the conductor thereof.

Further, preparing dielectric ceramic green sheets containing the powder of a dielectric material, such as titanium oxide, etc., interior electrode patterns are printed on a part of those ceramic green sheets, and then aligning them in vertical or horizontal direction, for a large number of sets thereof.

Furthermore, ceramic green sheets, other than those magnetic ceramic green sheets and those dielectric ceramic green sheets, are prepared so as to form ceramic layers having thermal expansion rate in the middle of those of the ceramics.

For example, the coefficient of linear expansion of the magnetic ceramic containing $Fe_2O_3$ of 49 mol %, NiO of 42 mol %, ZnO of 4 mol % and CuO of 5 mol %, is $13.0\times10^{-6}/°$ C., and the coefficient of linear expansion of the dielectric ceramic mainly containing $TiO_2$ is $8.5\times10^{-6}/°$ C. Then, by adding glass powder containing $Na_2O$ and/or $K_2O$ largely, which has a coefficient of linear expansion of $16.0\times10^{-6}/°$ C., which is sufficiently higher than those of the magnetic ceramic and the dielectric ceramic, into ceramic slurry with powder of the dielectric ceramic to form the ceramic green sheet, a ceramic can be obtained having a thermal expansion rate lying in the middle of those of the magnetic ceramic and the dielectric ceramic. On the other hand, by adding glass powder of the Si—B group, which has a coefficient of linear expansion of $5.0\times10^{-6}/°$ C., which is sufficiently lower than that of the magnetic ceramic, into the ceramic slurry with powder of the magnetic ceramic to form the ceramic green sheet, also a ceramic can be obtained which shows a thermal expansion rate lying in the middle of those of the magnetic ceramic and the dielectric ceramic.

Further, the magnetic ceramic mentioned above has a decreasing thermal expansion rate if the composition of ZnO is increased in spite of the composition of NiO of the components mentioned above. Therefore, it is also possible to obtain a ceramic having a thermal expansion rate laying in the middle of those of the magnetic ceramic and the dielectric ceramic.

With the measures mentioned above, the green sheets are prepared in advance for intermediate layers, each of which have a different coefficient of linear expansion in stepwise fashion within a range between those of the magnetic ceramic and the dielectric ceramic. In this case, the thinner the thickness of the intermediate layer of the laminated body, the more finely can be divided in stepwise fashion the difference in the coefficient of linear expansion between those of the magnetic ceramic and the dielectric ceramic. Therefore, a large number of the intermediate ceramic green sheets are prepared for reducing the difference, in advance. In other words, the greater the difference in the thermal expansion rate between the ceramic layers to be laminated, the thicker the ceramic green sheets that are prepared for forming the thicker intermediate layers.

Next, the ceramic green sheets are stacked up. First, a few or several number of the magnetic ceramic green sheets are stacked up, on the surface of which no internal electrode pattern is printed, and then a number of ceramic green sheets, on the surface of which different kinds of internal electrode patterns are printed respectively, are piled up one by one, depending on the number of turns of a necessary coil to be formed. On those laminated ceramic green sheets are further stacked a few or several of the magnetic ceramic green sheets, on the surface of which no internal electrode pattern is printed, again.

Then, the ceramic green sheets containing the ceramic, which has the adjusted coefficient of linear expansion lying in the middle of the magnetic ceramic and the dielectric ceramic in the manner mentioned above, are stacked upon them. As is mentioned previously, the coefficient of linear expansion of the dielectric ceramic is smaller than that of the magnetic ceramic, therefore, the ceramic green sheets are stacked up successively in the order from the ceramic having the larger coefficient of linear expansion to the smaller one, in this example of those ceramic green sheets.

Next, on the magnetic ceramic green sheets laminated in this manner, there are stacked a number of the dielectric ceramic green sheets, on the surface of which no internal electrode pattern is printed, and further thereon are stacked the ceramic green sheets, each having the printed internal electrode patterns shifted from one another, alternately. The ceramic green sheets having the internal electrode are laminated in an appropriate number thereof so as to obtain the necessary dielectric capacitance. Further, on the dielectric ceramic green sheets, there are stacked the dielectric green sheets, on the surface of which no internal electrode pattern is printed.

The sequential order of positioning the dielectric ceramic green sheets and the magnetic green sheets can be reversed. Namely, needless to say, the dielectric ceramic green sheets can be provided first and then the magnetic ceramic green sheets provided thereon afterward.

The laminated body obtained above, after being pressed to be contacted or joined together, is cut and divided into each chip, and the laminated chip is baked to be obtained as the baked laminated body 11.

The laminated body 11 obtained in this manner has a plurality of laminated ceramic layers 1,1 . . . , 1', 1' . . . formed as a unit or a body, and the layer construction thereof is shown in FIG. 1.

On the magnetic ceramic layer 1, there are formed internal electrodes 5*a*, 5*b* . . . in a circular shape. Those internal electrodes 5*a*, 5*b* . . . are connected to one another via the conductor in through-holes 6,6 . . . , thereby they are spirally connected inside of the laminated body 11 as a coil. The ceramic layers 1, 1 . . . made of a magnetic ceramic form the magnetic core of the obtained coil.

The internal electrodes 5*e* and 5*f*, which are formed on the ceramic layers 1 and 1 at the top and the bottom among the ceramic layers 1,1 . . . , including the internal electrodes 5*a*, 5*b* . . . , are extended and led onto a pair of opposing end surfaces of the laminated body 11.

Further, at both sides of the ceramic layers 1,1 . . . in which the above-mentioned internal electrodes 5*a*, 5*a* . . . are formed, there are stacked so-called blank ceramic layers 1',1' . . . on which no internal electrodes 5*a*, 5*a* . . . are formed.

Further, on the magnetic ceramic layers 1',1' . . . having no internal electrodes 5*a*, 5*b* . . . , there are stacked intermediate ceramic layers a, b, c and d, each having respective thermal expansion rate differing stepwise from one another in the range between those of the magnetic ceramic layers 1,1' and the dielectric ceramic layers 7,7' which are stacked thereon. The layer d at the lowest of the intermediate layers has a thermal expansion rate which is a little bit smaller than that of the magnetic ceramic layers 1,1', and the other intermediate layers c, b and a have respective thermal expansion rates increasing sequentially stepwise. The layer a at the top of the intermediate layers has a thermal expansion rate which is a little big higher than that of the dielectric ceramic layers 7,7'.

On the intermediate ceramic layers a, b, c and d, the dielectric ceramic layer 7' of the so-called blank is stacked, and the dielectric ceramic layers 7,7 . . . having the internal electrodes 8*a* and 8*b* are stacked on it. Further, on them, there are stacked the dielectric ceramic layers 7' without the internal electrodes 8*a* and 8*b*.

The internal electrodes 8*a* and 8*b* provided in the dielectric ceramic layers 7,7 . . . oppose each other through the same ceramic layers 7,7 . . . and are alternately led to a pair of the opposing edge surfaces of the laminated body 11, on which the internal electrodes 5*e* and 5*f* are extended.

Figure 2:
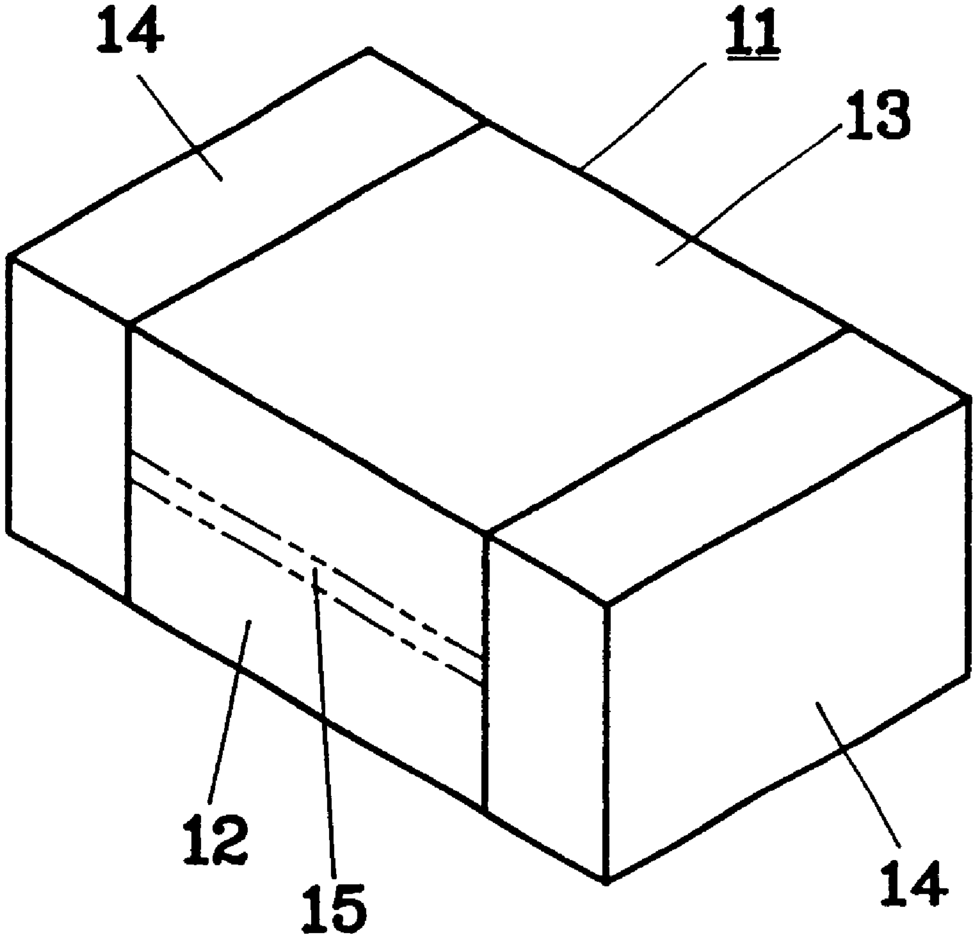
FIG. 2 shows the perspective view of the laminated composite electronic device in accordance with the present invention.

As shown in FIG. 2, at both edge surfaces of the laminated body 11, an electrically conductive paste, such as silver paste, is painted to be baked, and further are formed with external electrodes 14 and 14 provided by nickel plating or solder thereon, if necessary. To those external electrodes 14 and 14 are connected the above-mentioned internal electrodes 5*e*, 5*f*, 8*a* and 8*b* (refer FIG. 1) which are extended onto the edge surfaces of the laminated body 11. With this construction, in the example shown in the figure, the inductance formed by the internal electrodes 5*a*, 5*b* . . . and the dielectric capacitance obtained by the opposing internal electrodes 8*a* and 8*b* are connected in parallel to each other through the external electrodes 14 and 14.

In FIG. 2, reference numeral 12 denotes a laminated layer portion of the magnetic ceramic layers having the inductance formed therein by stacking the magnetic ceramic layers 1,1', reference numeral 13 is a laminated layer portion of the dielectric ceramic layers having the capacitance formed therein by stacking the dielectric ceramic layers 7, 7', and reference numeral 15 is a laminated layer portion of intermediate ceramic layers, which have thermal expansion rates which differ from one another in a stepwise fashion between those of the magnetic ceramic layers 1,1' and the dielectric ceramic layers 7,7' and are formed by stacking the intermediate layers a, b, c and d.

In this laminated composite electronic device, even if the laminated layer portion 12 of the magnetic ceramic layers differs from the laminated layer portion 13 of the dielectric ceramic layers in thermal expansion rate, the heat shock occurring in the cooling process after the baking is absorbed by the laminated layer portion 15 of the intermediate ceramic layers which is formed by providing the intermediate layers a, b, c and d, which differ from one another in stepwise fashion in the thermal expansion rates thereof, thereby hardly incurring a deformation, such as curving and/or cracks, in the laminated body 11.

Next, an explanation will be given for examples of the present invention in detail by referring to specific numerical values.

EXAMPLE 1

Raw material powders are prepared containing $Fe_2O_3$ of 49 mol %, NiO of 42 mol %, ZnO of 42 mol % and CuO of 5 mol %, for the magnetic powder of the ferrite group, and they are dispersed into an organic binder so as to make the magnetic slurry after they are pre-baked at the temperature of 680° C. respectively. The magnetic slurry is formed into magnetic ceramic green sheets of a thickness of 30 $\mu$m by the doctor blade method. The coefficient of linear expansion of the magnetic ceramic, formed by baking the magnetic ceramic green sheet as will be mentioned later, is $13.0\times10^{-6}$/° C.

After punching the through-holes at predetermined positions on a part of the ceramic green sheets, the internal electrodes of the silver paste are printed aligningly in vertical and/or horizontal directions in circular fashion on the large number of sets thereof, and the silver paste is vacuumed through and printed on the inner surface of those through-holes as the conductor thereof.

Other than the magnetic ceramic green sheets, the dielectric ceramic power mainly containing $TiO_2$ is prepared, and the dielectric ceramic green sheets are formed in the same manner mentioned above. On a part of the dielectric ceramic green sheets, the silver paste is also printed as the internal electrode patterns aligned in vertical and/or horizontal directions on the large number of sets thereof. The coefficient of linear expansion of the dielectric ceramic, formed by baking the dielectric ceramic green sheet as will be mentioned later, is $8.5\times10^{-6}$/° C., and has a difference of $4.5\times10^{-6}$/° C. from that of the magnetic ceramic mentioned in the above.

Further, by adding the dielectric material mainly containing the $TiO_2$ powder with glass powder having a composition of $SiO_2$ of 46.1 weight %, $B_2O_3$ of 1.5 weight %, $Na_2O$ of 19.8 weight %, $K_2O$ of 21.2 weight %, BaO of 9.9 weight % and ZnO of 1.5 weight %, by the amounts shown in Table 1 below with respect to the weight of the dielectric ceramic material, four (4) kinds of dielectric-glass ceramic green sheets A, B, C and D are formed. The coefficient of linear expansion of the glass of the compositions mentioned above is $16\times10^{-6}$/° C. and larger than that of the magnetic ceramic, as well as that of the dielectric ceramic of course. Further, in Table 1, the coefficients of linear expansion of the intermediate ceramic layers a, b, c and d are shown, which are formed by baking the above-mentioned dielectric-glass ceramic green sheets A, B, C and D. For comparison, the coefficients of linear expansion of the magnetic ceramic layer and the dielectric ceramic layer are also shown in it.

TABLE 1

| Ceramic Material | Add Amount of Glass | Coefficient of Linear Expansion |
|---|---|---|
| Dielectric Material | 0 weight % | $8.5 \times 10^{-6}$/° C. |
| Dielectric - Glass A | 13.3 weight % | $9.6 \times 10^{-6}$/° C. |
| Dielectric - Glass B | 26.7 weight % | $10.3 \times 10^{-6}$/° C. |
| Dielectric - Glass C | 40.0 weight % | $11.4 \times 10^{-6}$/° C. |
| Dielectric - Glass D | 53.3 weight % | $12.4 \times 10^{-6}$/° C. |
| Magnetic Material | — | $13.0 \times 10^{-6}$/° C. |

First of all, the magnetic ceramic green sheets of the blank on which no internal electrode pattern is printed are stacked, and then further on those are stacked the magnetic ceramic green sheets which are printed with the internal electrode patterns, one by one, in such manner that a coil is formed by the internal electrode patterns being connected in spiral fashion by the through-holes. Further, on those magnetic ceramic green sheets, the magnetic ceramic green sheets of the blank without a printed internal electrode pattern are stacked again.

Next, the above-mentioned four (4) kinds of dielectric-glass ceramic green sheets containing the dielectric-glass ceramics A, B, C and D are stacked in the order of D, C, B and A from the bottom.

Then, on the dielectric-glass ceramic green sheets are stacked several pieces of the dielectric ceramic green sheets not having an internal electrode pattern. On those, several pieces of the layers of the dielectric ceramic green sheets are stacked alternately, each of which has an internal electrode pattern shifted from one another. Further, on those are stacked again dielectric ceramic green sheets not having an internal electrode pattern.

The laminated body, after being subjected to a pressure of 390 Kgf/cm$^2$ to join them as a unit, is cut into respected chips. The laminated chips, which have not been baked yet, are treated at a temperature of 500° C. so as to remove the binder therefrom, and thereafter they are baked at a temperature of 890° C., thereby obtaining thousands of chips of the laminated body 11 shown in FIG. 1.

In FIG. 1, the magnetic ceramic layers 1,1 . . . and the magnetic ceramic layers 1',1' . . . are formed by baking the magnetic ceramic green sheets mentioned above. The intermediate ceramic layers a, b, c and d are formed by baking the above-mentioned respective dielectric-glass ceramic green sheets A, B, C and D. The dielectric ceramic layers 7,7 . . . and the dielectric ceramic layers 7',7' . . . are formed by baking the dielectric ceramic green sheets mentioned above.

The thickness of the respective layers of the magnetic ceramic layers 1,1', of the intermediate ceramic layers a, b, c and d, and of the magnetic ceramic layers 7 and 7' are shown in Table 2 below, in particular, in the column for sample No. 4.

Next, twenty (20) chips are picked from the laminated bodies manufactured in this manner at random and cut to check the presence of cracks on the sectional surface thereof by an optical microscope and no cracks were found in the twenty samples of the laminated bodies. The result of this is also shown in Table 2, in the column for sample No. 4.

On both side surfaces of the remaining laminated bodies 11 is painted the electrically conductive paste, such as silver paste, to be baked thereon, and further on it, the nickel plating or the solder is treated to form the external electrodes 14 and 14. Thereby, the laminated composite electronic device having the configuration shown in FIG. 2 is completed.

Further, the laminated bodies 11 shown in Table 2, in particular in the columns for sample Nos. 1 to 3, 5 and 6 thereof, are obtained, by stacking dielectric-glass ceramic green sheets for forming the intermediate ceramic layers a, b, c and d, and by changing the combination of the dielectric-glass ceramic green sheets for forming the intermediate ceramic layers a, b, c and d, in the same manner as mentioned above, they are also checked or tested for the presence of the cracks. The result of the testing are shown in Table 2 in the respective columns of sample Nos. 1 to 3, 5 and 6.

However, though the coefficient of linear expansion of those ceramic layers are as shown in Table 1, the magnetic ceramic layers of sample No. 2, which is marked with "*1", have a coefficient of linear expansion of $10.5\times10^{-6}$/° C., and sample No. 3, which is marked with "*2", has a coefficient of linear expansion of $11.5\times10^{-6}$/° C., respectively.

TABLE 2

| Sample No. | Thickness of Dielectric Layers (μm) | Thickness of Intermediate Layers (μm) A | B | C | D |
|---|---|---|---|---|---|
| 1 | 600 | — | — | — | — |
| 2 | 600 *1 | — | — | — | — |
| 3 | 600 *2 | — | — | — | — |
| 4 | 600 | 45 | 45 | 45 | 45 |
| 5 | 600 | 45 | — | 45 | 45 |
| 6 | 600 | 45 | — | — | 45 |

| Sample No. | Thickness of Magnetic Layers (μm) | Number of Occurrences of Cracks |
|---|---|---|
| 1 | 600 | 20 |
| 2 | 600 *1 | 0 |
| 3 | 600 *2 | 16 |
| 4 | 600 | 0 |
| 5 | 600 | 0 |
| 6 | 600 | 17 |

As is apparent from Table 2 mentioned above, the number of occurrences of cracks in the laminated body 11 is zero (0) in both sample No. 4, in which the intermediate layers a, b, c and d differing in four steps in the coefficients of linear expansion and having thickness of 45 μm are inserted between the magnetic ceramic layers 1,1' and the dielectric ceramic layers 7,7', and sample No. 5, in which the intermediate layers a, b and c differing in three steps in the coefficients of linear expansion and having thickness of 45 μm, are inserted between the magnetic ceramic layers 1,1' and the dielectric ceramic layers 7,7'. The difference among those ceramic layers is less than $2\times10^{-6}$/° C. for both of them. Further, with sample No. 2, in which no intermediate layer is inserted, no cracks occurred in the laminated body 11. The difference among those ceramic layers is also small, being such as $2\times10^{-6}$/° C.

On the other hand, when no intermediate ceramic layer is inserted, the cracks occur at a high frequency, for example, on samples Nos. 1 and 3 in which the difference in the coefficient of linear expansion between the magnetic ceramic layers 1,1' and the dielectric ceramic layers 7,7' exceeds the value, i.e., $2\times10^{-6}$/° C. Further, with sample No. 6 in which the intermediate layers a and d of two steps are inserted between the magnetic ceramic layers 1,1' and the dielectric ceramic layers 7,7', since the difference in the coefficient of linear expansion between those intermediate layers a and d exceeds $2\times10^{-6}$/° C., therefore, the cracks occur at a high frequency in the laminated body 11.

From those results, it is apparent that the insertion of the intermediate ceramic layers a, b, c and d between the magnetic ceramic layers 1,1' and the dielectric ceramic layers 7,7' is effective when the difference of them exceeds $2\times10^{-6}$/° C. in the coefficient of linear expansion. It is also apparent that, when the thickness of the intermediate ceramic layers a, b, c and d is about 10 μm, as is in the example mentioned above, the laminated body 11 can effectively be protected from cracks occurring therein by suppressing the differences in the coefficient of linear expansion thereof between the magnetic ceramic layers 1,1' and the intermediate ceramic layer a, between the dielectric ceramic layers 7,7' and the intermediate ceramic layer d, and also among the intermediate ceramic layers a, b, c and d, to be less than $2\times10^{-6}$/° C.

EXAMPLE 2

In the embodiment 1 mentioned above, in place of preparing the ceramic green sheets for forming the intermediate ceramic layers a, b, c and d obtained by adding the glass powder to the dielectric ceramic material, four (4) kinds of magnetic-glass ceramic green sheets A, B, C and D were prepared by adding glass powder of the Si—B group (i.e., aluminoborosilicate glass) having a coefficient of linear expansion of $5\times10^{-6}$/° C. into the magnetic ceramic material, by the amount shown in Table 3 below with respect to the weight of the magnetic ceramic material, respectively. In Table 3, the coefficients of linear expansion of each of the intermediate glass ceramic layers a, b, c and d are also shown, which are manufactured in such a manner as will be mentioned later. Further, in Table 3, the coefficient of linear expansion of the magnetic ceramic and that of the dielectric ceramic are further shown therein, for comparison.

TABLE 3

| Ceramic Material | Add. Amount of Glass | Coefficient of Linear Expansion |
|---|---|---|
| Dielectric Material | — | $8.5\times10^{-6}$/° C. |
| Magnetic - Glass A | 43.8 weight % | $9.6\times10^{-6}$/° C. |
| Magnetic - Glass B | 31.3 weight % | $10.3\times10^{-6}$/° C. |
| Magnetic - Glass C | 18.3 weight % | $11.4\times10^{-6}$/° C. |
| Magnetic - Glass D | 6.3 weight % | $12.4\times10^{-6}$/° C. |
| Magnetic material | 0 weight % | $13.0\times10^{-6}$/° C. |

Further, by using the magnetic-glass ceramic green sheets of the above-mentioned A through D, six (6) kinds of the laminated body 11 as shown in Table 4 are obtained in the same manner as in embodiment 1 mentioned above and are tested for the occurrence of cracks. The results are shown in the respective columns of Table 4.

In samples Nos. 2 and 3, the magnetic ceramic layers not containing a glass component are not stacked, however, in place of those, the above-mentioned magnetic-glass ceramic green sheet B from which can be obtained a ceramic having a coefficient of linear expansion of $10.4\times10^{-6}$/° C., and the above-mentioned magnetic-glass ceramic green sheet C from which can be obtained a ceramic having a coefficient of linear expansion of $11.3\times10^{-6}$/° C., are used to form the laminated body.

TABLE 4

| Sample No. | Thickness of Dielectric Layers (μm) | Thickness of Intermediate Layers (μm) A | B | C | D |
|---|---|---|---|---|---|
| 1 | 600 | — | — | — | |
| 2 | 600 | — | 600 | — | |
| 3 | 600 | — | — | 600 | — |
| 4 | 600 | 50 | 50 | 50 | 50 |
| 5 | 600 | 50 | — | 50 | 50 |
| 6 | 600 | 50 | — | — | 50 |

| Sample No. | Thickness of Magnetic Layers (μm) | Number of Occurrences of Cracks |
|---|---|---|
| 1 | 600 | 20 |
| 2 | — | 0 |
| 3 | — | 15 |

TABLE 4-continued

| | | |
|---|---|---|
| 4 | 600 | 0 |
| 5 | 600 | 0 |
| 6 | 600 | 18 |

As is apparent from Table 2 mentioned above, the number of occurrences of the cracks in the laminated body 11 was zero (0) for both sample No. 4, in which the intermediate layers a, b, c and d differing in four steps in the coefficients of linear expansion thereof and having a thickness of 50 μm, are inserted between the magnetic ceramic layers 1,1' and the dielectric ceramic layers 7,7', and sample No. 5, in which the intermediate layers a, b and c differing in three steps in the coefficients of linear expansion thereof and having a thickness of 50 μm, are inserted between the magnetic ceramic layers 1,1' and the dielectric ceramic layers 7,7'. The difference among the ceramic layers is also less than $2\times10^{-6}$/° C. for both of them. Further, with sample No. 2 in which the same ceramic layer as the intermediate ceramic layer b having a thickness of 600 μm is stacked in place of the magnetic ceramic layers 1,1', no cracks occur in the laminated body 11. The difference between the dielectric ceramic layers 7,7' and the intermediate ceramic layer b is also less than $2\times10^{-6}$/° C.

On the other hand, when an intermediate ceramic layer was not inserted, the cracks occur at a high frequency, for example, in sample No. 1 in which the difference in the coefficient of linear expansion between the magnetic ceramic layers 1,1' and the dielectric ceramic layers 7,7' exceeds $2\times10^{-6}$/° C.

In the same manner, the cracks occur at a high frequency in sample No. 3 in which the same ceramic layer as the intermediate ceramic layer c having a thickness of 600 μm is stacked in place of the magnetic ceramic layers 1,1'. Further, even with sample No. 6, in which intermediate layers a and d of two steps are inserted between the magnetic ceramic layers 1,1' and the dielectric ceramic layers 7,7', if the difference in coefficient of linear expansion between those intermediate layers a and d exceeds $2\times10^{-6}$/° C., the cracks occur at a high frequency in the laminated body 11.

From those results, the same can be understood as in the embodiment mentioned above.

EXAMPLE 3

In embodiment 1 mentioned above, in place of preparing the ceramic green sheets for forming the intermediate ceramic layers a, b, c and d by adding the glass powder to the dielectric ceramic material, various kinds of magnetic ceramic green sheets are prepared by changing the compositional content of the magnetic ceramic of ferrite group containing $Fe_2O_3$, NiO, ZnO and CuO, mainly those of ZnO and CuO, for forming the intermediate ceramic layers A through P as shown in Table 5, below. In Table 5, there are also shown the coefficient of linear expansion of each of the intermediate glass ceramic layer which are formed by baking those magnetic ceramic green sheets A through P as will be mentioned later.

TABLE 5

| | Composition Rate (mol %) | | | | Coefficient of Linear Expansion |
|---|---|---|---|---|---|
| | $Fe_2O_3$ | NiO | ZnO | CuO | ($\times 10^{-6}$/° C.) |
| A | 49.0 | 1.0 | 44.0 | 6.0 | 9.6 |
| B | 49.0 | 11.0 | 34.0 | 6.0 | 10.5 |
| C | 49.0 | 20.0 | 25.0 | 6.0 | 11.2 |
| D | 49.0 | 25.0 | 20.0 | 6.0 | 11.9 |
| E | 49.0 | 30.0 | 15.0 | 6.0 | 12.5 |
| F | 49.0 | 35.0 | 10.0 | 6.0 | 13.0 |
| G | 49.0 | 42.0 | 3.0 | 6.0 | 13.7 |
| H | 49.0 | 45.0 | 0.0 | 6.0 | 14.0 |
| I | 40.0 | 0.0 | 45.0 | 5.0 | 9.6 |
| J | 40.0 | 25.0 | 20.0 | 5.0 | 12.1 |
| K | 40.0 | 45.0 | 0.0 | 5.0 | 14.4 |
| L | 50.0 | 0.0 | 45.0 | 5.0 | 9.5 |
| M | 50.0 | 25.0 | 20.0 | 5.0 | 12.0 |
| N | 50.0 | 45.0 | 0.0 | 5.0 | 14.2 |
| O | 49.0 | 25.0 | 23.0 | 3.0 | 12.0 |
| P | 49.0 | 25.0 | 6.0 | 20.0 | 12.0 |

From the magnetic ceramics A through P shown in Table 5 above, it is apparent that the higher the compositional amount of NiO in place of CuO in the magnetic ceramic containing $Fe_2O_3$, NiO, ZnO and CuO, the higher the coefficient of linear expansion thereof. On the other hand, as can be seen from the magnetic ceramics, I through N, even if the compositional amount of $Fe_2O_3$ is changed, there is no substantial change in the coefficient of linear expansion thereof. In the same manner, it is also apparent that no substantial change occurs if the compositional amount of CuO is changed from the magnetic ceramics O and P. Further, adding an oxide of 1 mol % of Co, Mn, Si, Pb, Li, B, P, Cr, Mo, W, Zr, Ca, Ti, K, Ag or Bi to the magnetic ceramics shown in Table 5 will not cause any substantial change in the coefficient of linear expansion in any one of them.

Further, using A, B, C and D of the magnetic ceramic green sheets mentioned above, six (6) kinds of laminated bodies 11 are obtained in the same manner as in example 1 mentioned above, and are tested for the occurrence of the cracks. The result of this is shown in the respective columns of Table 6.

In the samples Nos. 2 and 3, the magnetic ceramic layers having a coefficient of linear expansion of $13.0\times10^{-6}$/° C. are not stacked up nor laminated, however, in place of them, the above-mentioned magnetic-glass ceramic green sheet B from which can be obtained a ceramic having a coefficient of linear expansion of $10.5\times10^{-6}$/° C., and the above-mentioned magnetic-glass ceramic green sheet C from which can be obtained a ceramic having a coefficient of linear expansion of $11.2\times10^{-6}$/° C., are stacked respectively.

TABLE 6

| Sample | Thickness of Dielectric Layers | Thickness of Intermediate Layers (μm) | | | |
|---|---|---|---|---|---|
| No. | (μm) | A | B | C | D |
| 1 | 600 | — | — | — | — |
| 2 | 600 | — | 600 | — | — |
| 3 | 600 | — | — | 600 | — |
| 4 | 600 | 40 | 40 | 40 | 40 |
| 5 | 600 | 40 | — | 40 | 40 |
| 6 | 600 | 40 | — | — | 40 |

TABLE 6-continued

| Sample No. | Thickness of Magnetic Layers ($\mu$m) | Number of Occurrences of Cracks |
|---|---|---|
| 1 | 600 | 20 |
| 2 | — | 0 |
| 3 | — | 17 |
| 4 | 600 | 0 |
| 5 | 600 | 0 |
| 6 | 600 | 18 |

From the above Table 6, results are obtained which are nearly equal to those obtained from Table 4, relating to the embodiment mentioned above, therefore similar conclusions can be drawn therefrom.

Next, by using the magnetic ceramic green sheets A through E of the above-mentioned magnetic ceramic materials, eight (8) kinds of laminated bodies 11 as shown in Table 7 are obtained in the same manner as in embodiment 1 mentioned above and are tested for the occurrence of cracks.

The results of this are shown in the respective columns of Table 7.

TABLE 7

| Sample No. | Thickness of Dielectric Layers ($\mu$m) | Thickness of Intermediate Layers ($\mu$m) | | | | |
|---|---|---|---|---|---|---|
| | | A | B | C | D | E |
| 1 | 600 | — | — | — | — | — |
| 2 | 600 | — | — | 100 | — | — |
| 3 | 600 | — | 30 | 0 | 30 | — |
| 4 | 600 | — | 50 | 0 | 50 | — |
| 5 | 600 | 10 | 10 | 10 | 10 | 10 |
| 6 | 600 | — | 10 | 0 | 10 | 10 |
| 7 | 600 | — | 30 | 10 | 10 | 10 |
| 8 | 600 | — | 40 | 10 | 10 | 10 |

| Sample No. | Thickness of Magnetic Layers ($\mu$m) | Number of Occurrences of Cracks |
|---|---|---|
| 1 | 600 | 20 |
| 2 | 600 | 20 |
| 3 | 600 | 15 |
| 4 | 600 | 0 |
| 5 | 600 | 0 |
| 6 | 600 | 16 |
| 7 | 600 | 6 |
| 8 | 600 | 0 |

As is apparent from Table 7 mentioned above, the number of occurrences of cracks in the laminated body 11 is zero (0) in both sample No. 5, in which the intermediate layers a, b . . . , which differin five steps in the coefficient of linear expansion and have a thickness of 10 $\mu$m, are inserted between the magnetic ceramic layers 1,1' and the dielectric ceramic layers 7,7'. The differences among those respective ceramic layers are also less than $1\times10^{-6}/°$ C. Also, with sample No. 4 in which the intermediate layers b and d differ by two steps in the coefficients of linear expansion are inserted between the magnetic ceramic layers 1,1' and the dielectric ceramic layers 7,7', the number of occurrences of the cracks in the laminated body 11 is also zero (0). In this sample though, the difference among the respective ceramic layers is greater than $1\times10^{-6}/°$ C. and the thickness thereof 50 $\mu$m, which is five (5) times larger than that of the intermediate ceramic layers mentioned above.

On the other hand, when an intermediate ceramic layer is not inserted, the cracks occur at a high frequency. For example, with sample No. 1 in which the difference in the coefficient of linear expansion between the magnetic ceramic layers 1,1' and the dielectric ceramic layers 7,7' is large. Further, even with sample No. 6 in which the intermediate layers b and d of two steps are inserted between the magnetic ceramic layers 1,1' and the dielectric ceramic layers 7,7' and the thickness of those intermediate ceramic layers are thin, such as 30$\mu$m each, the cracks occur at a high frequency in the laminated body 11 if the difference in the coefficient of linear expansion between those intermediate layers b and d exceeds $1\times10^{-6}/°$ C.

Moreover, even if the difference in the coefficient of linear expansion among the magnetic ceramic layer 1,1', the intermediate layers a,b . . . , and the dielectric ceramic layers 7,7' comes to around $2\times10^{-6}/°$ C., for instance as with sample No. 8, if there is inserted a relatively thick intermediate ceramic layer b having a thickness of 40$\mu$m, no cracks occur in the laminated body 11. However, when the thickness of the intermediate ceramic layer b is thin, such as 10 $\mu$m or 30$\mu$m as of samples Nos. 6 and 7, the cracks easily occur, then, the thinner the thickness of it, the higher the frequency of the cracks occurring.

From those results, it is apparent that, when the thickness of the intermediate ceramic layers a, b, c and d is thin, such as about 10 $\mu$m, the laminated body 11 can be protected from cracks occurring therein, effectively, by suppressing the differences among the respective ceramic layers to less than $1\times10^{-6}/°$ C., however, if the difference is more than that value, it is necessary to make the thickness of the intermediate layers a, b, c, d and e laminated together more than 10 $\mu$m.

As is fully explained above, the laminated composite electronic device, in accordance with the present invention, can be prevented from thermal stress caused by the differences between the different ceramic layers 1,1' and 7,7'.

Thereby, it is possible to prevent deformation, such as curving, and the occurrence of cracks inside of the laminated body 11.

What is claimed is:

1. A method for manufacturing a laminated composite electronic device comprising the steps of:

providing a first ceramic layer, a second ceramic layer and intermediate ceramic layers positioned between said first and second ceramic layers to form a laminated body, said first ceramic layer having a coefficient of linear expansion greater than that of the second ceramic layer and the intermediate ceramic layers having respectively decreasing coefficients of linear expansion from the intermediate layer closest to the first ceramic layer to the intermediate layer closest to the second ceramic layer, the intermediate ceramic layer closest to the first ceramic layer having a coefficient of linear expansion less than that of the first ceramic layer and the intermediate layer closest to the second ceramic layer having a coefficient of linear expansion greater than that of the second ceramic layer, said intermediate ceramic layers having varying NiO and ZnO contents for adjusting the thermal expansion rates thereof; and baking the laminated body to form the laminated composite electronic device.

2. The method of claim 1, wherein said first ceramic layer is a magnetic ceramic layer and the second ceramic layer is a dielectric ceramic layer.

3. The method of claim 1, wherein said intermediate ceramic layers include a ceramic layer containing a glass.

4. The method of claim 1, wherein said intermediate ceramic layers include a ceramic layer having a main component of at least one of said first and second ceramic layers.

5. The method of claim 4, wherein said intermediate ceramic layers include a ceramic layer adjusted in thermal expansion rate by changing the content of the main component.

6. The method of claim 1, wherein either one of said second ceramic layer and said intermediate ceramic layers are made of a dielectric ceramic material.

7. The method of claim 1, wherein said intermediate ceramic layers include $Fe_2O3$, NiO, ZnO and CuO as components thereof.

8. The method of claim 1, wherein at least one of said intermediate ceramic layers has a thickness different from those of adjacent ceramic layers.

9. A method for manufacturing a laminated composite electronic device comprising the steps of:

providing a first group of magnetic ceramic layers laminated together and having an inductor formed thereon, a second group of magnetic ceramic layers, at least one intermediate ceramic layer, a first group of dielectric ceramic layers and a second group of dielectric ceramic layers laminated together and having a capacitor formed thereon, said second group of magnetic ceramic layers having a coefficient of linear expansion greater than that of the first group of dielectric ceramic layers and the at least one intermediate ceramic layer having a coefficient of linear expansion higher than that of the first group of dielectric ceramic layers and lower than that of the second group of magnetic ceramic layers and laminating the second group of magnetic ceramic layers to the first group of magnetic ceramic layers, the at least one intermediate ceramic layer to the second group of magnetic ceramic layers, the first group of dielectric ceramic layers to the at least one intermediate ceramic layer and the second group of dielectric ceramic layers to the first group of dielectric ceramic layers to form the laminated composite electronic device.

* * * * *